United States Patent
Taromaru et al.

(10) Patent No.: US 7,489,948 B2
(45) Date of Patent: Feb. 10, 2009

(54) RECEIVER CAPABLE OF RECEIVING RADIO SIGNAL WITH HIGH QUALITY

(75) Inventors: Makoto Taromaru, Kyoto (JP); Takashi Ohira, Kyoto (JP); Takuma Sawaya, Kyoto (JP); Hiroki Tanaka, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 365 days.

(21) Appl. No.: 11/050,890

(22) Filed: Jan. 27, 2005

(65) Prior Publication Data

US 2005/0170800 A1 Aug. 4, 2005

(30) Foreign Application Priority Data

Jan. 30, 2004 (JP) ............................. 2004-022956
Jan. 30, 2004 (JP) ............................. 2004-022957

(51) Int. Cl.
*H04M 1/00* (2006.01)
(52) U.S. Cl. .................. 455/562.1; 455/13.3; 342/368; 343/835
(58) Field of Classification Search ................ 455/208, 455/277.1, 226.4, 296, 562.1, 303, 12.1, 455/13.2, 561; 348/725, 194, 726–728; 342/361–368; 343/810, 812, 815, 819, 833–835

See application file for complete search history.

(56) References Cited

U.S. PATENT DOCUMENTS

| 5,510,859 | A  | * | 4/1996 | Douglass et al. ............ 348/731 |
| 6,728,294 | B1 |   | 4/2004 | Kohno et al. |
| 6,778,843 | B2 | * | 8/2004 | Oura ........................... 455/561 |
| 6,931,081 | B2 | * | 8/2005 | Meijer et al. ................. 375/316 |

(Continued)

FOREIGN PATENT DOCUMENTS

| EP | 0 877 440 A1 | 11/1998 |
| JP | 62-069733 | 3/1987 |

(Continued)

OTHER PUBLICATIONS

Japanese Office Action issued in corresponding Japanese Patent Application No. 2004-022957, dated May 15, 2007.

(Continued)

*Primary Examiner*—Nhan T Le
(74) *Attorney, Agent, or Firm*—McDermott Will & Emery LLP

(57) ABSTRACT

A receiver includes an array antenna, terminals, switches, a receiving circuit, a switch control unit and a reactance setting unit. Receiving circuit determines a received frequency and a received signal quality of a received signal by demodulating the received signal provided from the array antenna. The receiving circuit provides the received frequency to the reactance setting unit as a frequency setting signal, and provide the received signal quality to the switch control unit and the reactance setting unit. The reactance setting unit sets a set of the reactances corresponding to the received frequency in the terminals for each frequency, and the switch control unit switches connections in the switches to provide the received signal quality equal to or greater than the threshold.

16 Claims, 8 Drawing Sheets

U.S. PATENT DOCUMENTS 7,245,892 B2 * 7/2007 Merio .................. 455/209
2004/0102221 A1 * 5/2004 Shirosaka et al. ........ 455/562.1

FOREIGN PATENT DOCUMENTS

| JP | 8-65223 A | 3/1996 |
| JP | 10-308694 | 11/1998 |
| JP | 2000-295151 A | 10/2000 |
| JP | 2000-332668 | 11/2000 |
| JP | 2002-353867 | 12/2002 |
| JP | 2003-32161 A | 1/2003 |
| JP | 2003-92544 A | 3/2003 |
| JP | 2003-283399 | 10/2003 |

OTHER PUBLICATIONS

Japanese Office Action, with English Translation, issued in Corresponding Japanese Patent Application No. 2004-022956, mailed on Jun. 19, 2007.

Taromaru, M. et al., "A Theoretical Performance Analysis of Antenna Switch Diversity for TDMA Mobile Radio", IEICE Trans., B-II, vol. J80-B-11, No. 9 (Sep. 1997) pp. 805-808.

Sawaya, T. et al., "Basic Theory on 3-element Espar Antenna from Reactance Diversity Viewpoint", Technical Report of IEICE, DSP2002-161, SAT2002-111, RCS2002-230 (Jan. 2003).

Japanese Office Action, with English Translation, issued in Japanese Patent Application No. JP 2004-022957, mailed on Jan. 22, 2008.

* cited by examiner

| RECEIVED FREQUENCY | SET OF REACTANCE VALUES |
|---|---|
| f1 | RV1([x11,x12],[x21,x22])f1 |
| f2 | RV2([x11,x12],[x21,x22])f2 |
| ⋮ | ⋮ |
| fm | RVm([x11,x12],[x21,x22])fm |

| RECEIVED FREQUENCY | SET OF INITIAL REACTANCE VALUES |
|---|---|
| f1 | RV1_int([x11_int,x12_int],[x21_int,x22_int])f1 |
| f2 | RV2_int([x11_int,x12_int],[x21_int,x22_int])f2 |
| ⋮ | ⋮ |
| fm | RVm_int([x11_int,x12_int],[x21_int,x22_int])fm |

| TRANSMISSION MODE | RECEIVED FREQUENCY | ANTENNA SELECTION INFORMATION |
|---|---|---|
| MDE1 | f1 | IF(ANT211~213)f1 |
|  | f2 | IF(ANT211~213)f2 |
|  | ⋮ | ⋮ |
|  | fm | IF(ANT211~213)fm |
| MDE2 | f1 | IF(ANT211~213)f1 |
|  | f2 | IF(ANT211~213)f2 |
|  | ⋮ | ⋮ |
|  | fm | IF(ANT211~213)fm |

TBL

RECEIVER CAPABLE OF RECEIVING RADIO SIGNAL WITH HIGH QUALITY

BACKGROUND OF THE INVENTION

1. Field of the Invention

The present invention relates to a receiver receiving radio signals such as television signals by an antenna having an electrically switchable directivity and decoding the same as well as a receiver receiving radio signals such as television signals by space diversity or directivity diversity and decoding the same.

2. Description of the Background Art

Diversity, which switches characteristics of antennas, has been performed for receiving radio signals with high quality. This diversity includes spatial diversity, directivity diversity and others.

According to the space diversity, a plurality of antennas are arranged in spatially spaced positions, respectively, and the antenna actually receiving radio signals is switched among the plurality of antennas for receiving the radio signals. According to the directivity diversity, the plurality of antennas have different directivities, respectively, and the directivity is switched among them for receiving the radio signals.

According to the space diversity and directivity diversity, the antenna or directivity is switched when a quality of a received signal such as a strength of the received signal becomes lower than a threshold (see Makoto Taromaru and Yoshihiko Akaiwa, "A Theoretical Performance Analysis of Antenna Switch Diversity for TDMA Mobile Radio", IEICE Trans., B-II, Vol. J80-B-II, No. 9, pp. 805-808, September 1997).

As an antenna having a switchable directivity, an antenna, which is formed of one feeder element and a plurality of passive elements equally spaced around the one feeder element, has been known. In this antenna, the directivity can be changed by changing sets of reactance values loaded in the plurality of passive elements. The antenna, of which directivity can be switched in accordance with the set of reactance values, is controlled to change the directivity in accordance with a strength of a received signal for receiving radio signals of higher intensities (see Takuma Sawaya, Kyoichi Iigusa and Takashi Ohira, "Basic Theory on 3-element Espar Antenna for Reactance Diversity Viewpoint", Technical Report of IEICE, DSP2002-161, SAT2002-111, RCS2002-230, January 2003).

SUMMARY OF THE INVENTION

In an operation of receiving radio signals such as television signals by an antenna having a switchable directivity, the directivity of the antenna cannot be switched according to a frequency of the radio signal so that it is impossible to receive the radio signals of frequencies expanding over a wide range with high quality.

In the conventional diversity, since the antenna or directivity is switched based on a fixed threshold, the antenna cannot receive the radio signals with high quality.

Accordingly, an object of the invention is to provide a receiver capable of receiving radio signals with high quality.

Another object of the invention is to provide a receiver capable of receiving radio signals over a wide frequency range.

According to the invention, a receiver for receiving radio signals having a plurality of frequencies and being transmitted by radio communication in a predetermined frequency range, includes an antenna, a directivity pattern setting unit and a directivity switching unit. The antenna has an electrically switchable directivity. The directivity pattern setting unit has a plurality of directivity patterns corresponding to the plurality of frequencies and each formed of a plurality of directivities, and sets the directivity patterns corresponding to the plurality frequencies, respectively. The directivity switching unit extracts an appropriate directivity from the plurality of directivities included in the directivity pattern set by the directivity pattern setting unit such that the radio signal received by the antenna has a received signal quality equal to or greater than a threshold, and switches the directivity of the antenna to the appropriate directivity.

Preferably, the threshold is variable in response to a received signal strength of the radio signal.

Preferably, the threshold is variable in response to a bit rate of the received signal of the radio signal.

Preferably, the threshold is variable in response to a transmission mode of the radio signal.

Preferably, the radio signal is a television signal. The directivity switching unit switches the directivity to the appropriate directivity in synchronization with frames formed of a predetermined number of image data obtained by demodulating the television signal.

Preferably, the radio signal is a television signal. The directivity switching unit switches the directivity to the appropriate directivity during a switching period of a screen displaying a predetermined number of image data obtained by demodulating the television signal.

Preferably, the plurality of directivity patterns are determined when the receiver is activated.

Preferably, the radio signal is an analog television signal. The received signal quality is detection/non-detection of a color burst signal for displaying a color image in the analog television signal.

Preferably, the radio signal is a television signal. The received signal quality is the fact that errors of N (N: natural number) or more in number continuously occur in frames formed of a predetermined number of image data obtained by demodulating the television signal.

Preferably, the radio signal is a digital television signal in an orthogonal frequency division multiplex scheme. The received signal quality is whether a pilot signal allocated to a specific subcarrier in the orthogonal frequency division multiplex scheme is detected in the digital television signal or not.

Preferably, the antenna includes a feeder element and at least one passive element. The at least one passive element is arranged around the feeder element. The directivity pattern setting unit sets the directivity patterns corresponding to the plurality of frequencies by changing the set of values of reactances loaded in the at least one passive element. The directivity switching unit switches the directivity of the antenna to the appropriate directivity by changing the set of the reactance values.

According to the invention, a receiver for receiving a radio signal includes an antenna device and an antenna switching unit. The antenna device includes a plurality of antennas having different antenna characteristics for receiving the radio signal. The antenna switching unit has antenna selection information for selecting from the plurality of antennas the appropriate antenna setting a received signal quality of the received signal received by the antenna device to or above a threshold, and selects the appropriate antenna in accordance with the antenna selection information when the received signal quality is lower than the threshold. The threshold is set in accordance with reception conditions of the radio signal.

Preferably, the antenna device includes the plurality of antennas having different reception characteristics for receiving the radio signal, or the plurality of antennas having different directivities for receiving the radio signal.

Preferably, the antenna selection information includes priorities assigned to the plurality of antennas. The antenna switching unit selects the appropriate antenna in accordance with the priorities when the received signal quality is smaller than the threshold.

Preferably, the antenna selection information includes antenna designation information for designating the antennas providing the received signal qualities ranked in a predetermined place or higher among the plurality of antennas. The antenna switching unit selects the appropriate antenna in accordance with the antenna designation information when the received signal quality is lower than the threshold.

Preferably, the antenna switching unit further selects the appropriate antenna while changing the threshold in a predetermined range, and performs threshold determining processing to determine a value providing the highest received signal quality as the threshold.

Preferably, the antenna switching unit performs the threshold determining processing when the received signal quality becomes lower than a low threshold lower than the threshold N (N: natural number) times or more.

Preferably, the radio signal is a television signal. The antenna switching unit selects the appropriate antenna in synchronization with a frame formed of a predetermined number of image data obtained by demodulating the television signal.

Preferably, the antenna switching unit stops the switching of the antenna for a constant period after the appropriate antenna is selected.

Preferably, the radio signal is a television signal. The antenna switching unit selects the appropriate antenna during a switching period of a screen displaying a predetermined number of image data obtained by demodulating the television signal.

The receiver according to the invention switches the directivity of the antenna receiving the radio signal such that the received signal quality representing the quality of the received signal at each frequency of the radio signal becomes equal to or greater than the threshold.

According to the invention, therefore, the radio signals can be received with high sensitivity over the whole frequency of the radio signal. Thus, the radio signals can be received with high sensitivity over a wide range of the frequency.

According to the invention, the receiver sets the threshold in accordance with the reception conditions of the received signal. The antenna receiving the radio signal is switched such that the received signal quality representing the quality of the received signal may become equal to or greater than the threshold in each transmission mode.

According to the invention, therefore, the radio signal can be received with high quality.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the figures, the same or corresponding portions bear the same reference numbers, and description thereof is not repeated.

First Embodiment

Figures 1, 2:
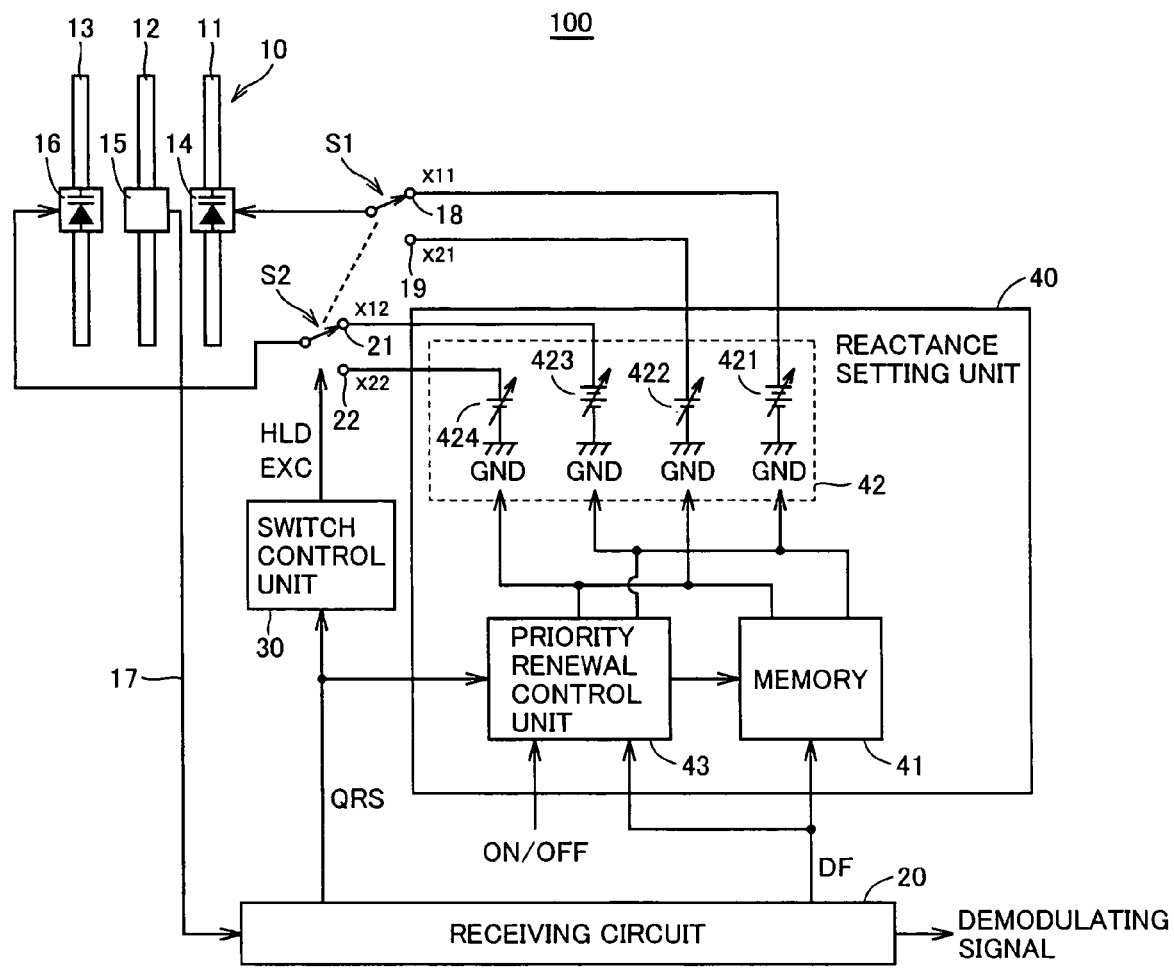
FIG. 1 is a schematic block diagram of a receiver according to a first embodiment.
FIG. 2 schematically illustrates a table stored in a memory shown in FIG. 1.

FIG. 1 is a schematic block diagram of a receiver according to a first embodiment. Referring to FIG. 1, a receiver 100 of the first embodiment includes an array antenna 10, a switch S1 having terminals 18 and 19, a switch S2 having terminals 21 and 22, a receiving circuit 20, a switch control unit 30 and a reactance setting unit 40.

Specifically, receiver 100 is included in a television set placed in a room, or in a portable or car-mounted television set. Receiver 100 receives television signals propagating in a frequency band formed of received frequencies f1-fm (m: natural number).

Array antenna 10 is formed of antenna elements 11-13. Antenna element 12 is a feeder element, and antenna elements 11 and 13 are passive elements. Antenna elements 11-13 are arranged in a planar form, and antenna elements 11 and 13 are arranged symmetrical with respect to antenna element 12.

Antenna elements 11, 12 and 13 include a varactor diode 14, a feeder circuit 15 and varactor diode 16, respectively. Feeder circuit 15 is connected to receiving circuit 20 via a coaxial cable 17.

Varactor diode 14 receives a reactance value x11 or x21 via switch S1, and varactor diode 16 receives reactance value x12 or x22 via switch S2. Depending on reactance values x11 and x12 or reactance values x21 and x22, an electrical length of each of antenna elements 11 and 13 changes, and resonance lengths between the feeder element, i.e., antenna element 12 and passive elements, i.e., antenna elements 11 and 13 change. Accordingly, the directivity of array antenna 10 changes.

Thus, array antenna 10 receives a set of reactance values [x11, x12] or [x21, x22] via switch S1 or S2, and changes the directivity depending on the received reactance value set [x11, x12] or [x21, x22] for receiving incoming radio waves. Array antenna 10 provides the received radio waves to receiving circuit 20 from feeder circuit 15 of antenna element 12 via coaxial cable 17.

Receiving circuit 20 receives the received signal from feeder circuit 15 of array antenna 10, and demodulates the signal thus received to provide a demodulated signal. Receiving circuit 20 detects a frequency of the received signal, and provides, as a frequency setting signal DF, the detected frequency to a reactance setting unit 40. Receiving circuit 20 produces a received signal quality QRS representing a quality of the received signal, and provides it to switch control unit 30 and reactance setting unit 40.

Switch control unit 30 compares quality QRS of the received signal received from receiving circuit 20 with a threshold Qth. When received signal quality QRS is equal to or greater than threshold Qth, switch control unit 30 issues a holding signal HLD to switches S1 and S2. When received signal quality QRS is lower than threshold Qth, switch control unit 30 issues a switching signal EXC to switches S1 and S2.

Switches S1 and S2 are connected to terminals 18 and 21 or to terminals 19 and 22, respectively. Depending on holding signal HLD provided from switch control unit 30, switches S1 and S2 hold the connection to terminals 18 and 21 or to terminals 19 and 22, respectively. Further, in accordance with switching signal EXC provided from switch control unit 30, switches S1 and S2 switch the connection from terminals 18 and 21 to terminals 19 and 22, and vice versa, respectively.

In response to switching signal EXC, switches S1 and S2 simultaneously switch the connection from terminals 18 and 21 to terminals 19 and 22, and vice versa, respectively. Thus, such a situation does not occur that switching signal EXC causes only one of switches S1 and S2 to switch the connection. When switch S1 is connected to terminal 18, switch S2 is necessarily connected to terminal 21. When switch S1 is connected to terminal 19, switch S2 is necessarily connected to terminal 22. Thereby, the set of reactance values provided to array antenna 10 is switched between [x11, x12] and [x21, x22].

Reactance setting unit 40 includes a memory 41, a voltage supply circuit 42 and a priority renewal control unit 43. FIG. 2 schematically illustrates a table stored in memory 41 shown in FIG. 1. Referring to FIG. 2, a table TBL contains received frequencies f1-fm and sets RV1-RVm of the reactance values. Reactance value sets RV1-RVm are employed corresponding to received frequencies f1-fm, respectively. Reactance value sets RV1-RVm are formed of ([x11, x12], [x21, x22])f1, ([x11, x12], [x21, x22])f2, . . . and ([x11, x12], [x21, x22])fm. Thus, each of reactance value sets RV1-RVm is formed of two reactance values. For each of received frequencies f1-fm, reactance value set [x11, x12] or [x21, x22] is determined to change the directivity of array antenna 10 to a maximum extent, and to set an input impedance of array antenna 10 to 75 ohms.

As described above, memory 41 stores table TBL, in which reactance value sets RV1-RVm corresponding to respective frequencies f1-fm are determined such that, for each of frequencies f1-fm, the directivity of array antenna 10 changes to a maximum extent, and array antenna 10 has the input impedance of 75 ohms.

Each of reactance value sets RV1-RVm determines the directivity of array antenna 10, and reactance value sets RV1-RVm correspond to the directivity patterns of array antenna 10. Reactance value sets RV1-RVm, which correspond to the directivity patterns of array antenna 10, are kept after the activation of receiver 100.

Also, reactance value sets RV1-RVm, which correspond to the directivity patterns of array antenna 10, are renewed at constant intervals after the activation of receiver 100.

Further, reactance value sets RV1-RVm, which correspond to the directivity patterns of array antenna 10, are renewed when a situation, in which received signal quality QRS is lower than threshold Qth, continuously occurs N (N: natural number) or more times after activation of receiver 100.

Further, reactance value sets RV1-RVm, which correspond to the directivity patterns of array antenna 10, are renewed when a situation, in which received signal quality QRS is lower than threshold Qth, continuously occurs N or more times within a predetermined period after activation of receiver 100.

Further, reactance value sets RV1-RVm, which correspond to the directivity patterns of array antenna 10, are renewed when the transmission mode of the radio signal is switched.

Further, reactance value sets RV1-RVm, which correspond to the directivity patterns of array antenna 10, are renewed when change occurs in wave environment where the radio signals propagate.

Further, reactance value sets RV1-RVm, which correspond to the directivity patterns of array antenna 10, are renewed when movement of receiver 100 is detected.

Referring to FIG. 1 again, memory 41 receives frequency setting signal DF from receiving circuit 20, reads the reactance value set (one of reactance value sets RV1-RVm) corresponding to the received frequency (one of received frequencies f1-fm) indicated by received frequency setting signal DF from table TBL, and provides the reactance value set thus read to voltage supply circuit 42.

Voltage supply circuit 42 is formed of power supplies 421-424. Power supplies 421-424 are connected between terminals 18, 19, 21 and 22 and a ground node GND, respectively. Power supplies 421-424 supply voltages for achieving the reactance value set, which are received from memory 41 or priority renewal control unit 43, to terminals 18, 19, 21 and 22, respectively. More specifically, power supply 421 supplies voltages $(V11)_{f1\text{-}fm}$ to terminal 18 for achieving reactance values $(x11)_{f1\text{-}fm}$ determined depending on received frequencies f1-fm, respectively. Power supply 422 supplies voltages $(V21)_{f1\text{-}fm}$ to terminal 19 for achieving reactance values $(x21)_{f1\text{-}fm}$ determined depending on received frequencies f1-fm, respectively. Power supply 423 supplies voltages $(V12)_{f1\text{-}fm}$ to terminal 21 for achieving reactance values $(x12)_{f1\text{-}fm}$ determined depending on received frequencies f1-fm, respectively. Power supply 424 supplies voltages $(V22)_{f1\text{-}fm}$ to terminal 22 for achieving reactance values $(x22)_{f1\text{-}fm}$ determined depending on received frequencies f1-fm, respectively. Therefore, power supplies 421-424 supply voltages depending on received frequencies f1-fm to terminals 18, 19, 21 and 22, respectively.

Priority renewal control unit 43 receives received signal quality QRS and frequency setting signal DF from receiving circuit 20, and also receives ON and OFF signals from a power supply (not shown) of receiver 100. When priority renewal control unit 43 receives the ON signal (GT1), or receives the OFF signal (GT2), or when received signal quality QRS continuously becomes lower than threshold Qth N (N: natural number) times (GT3), priority renewal control unit 43 renews reactance value sets ([x11, x12], [x21, x22])f1, ([x11, x12], [x21, x22])f2, . . . and ([x11, x12], [x21, x22])fm.

More specifically, priority renewal control unit 43 provides the reactance value sets ([x11-xi1], [x12-xi2])f1, ([x11-xi1],

[x12-xi2])f2, ... and ([x11-xi1], [x12-xi2])fm (i: natural number) for respective frequencies f1-fm to voltage supply circuit 42 according to the timing of the foregoing cases (GT1), (GT2) and (GT3) to change the set of the reactance values, which are set in antenna elements 11 and 13. Priority renewal control unit 43 measures received signal quality QRS corresponding to each of the reactance value sets, detects the reactance value sets, which provide the received signal qualities ranked in the first and second places, and stores the detected sets in memory 4 as sets ([x11, x12], [x21, x22])f1, ([x11, x12], [x21, x22])f2, ... and ([x11, x12], [x21, x22])fm.

The expression of "[x11, xi1]" represents the reactance value set in antenna element 11 for corresponding one of frequencies f1-fm, and the expression of "[x12, xi2]" represents the reactance value set in antenna element 13 for corresponding one of frequencies f1-fm.

Figure 3:
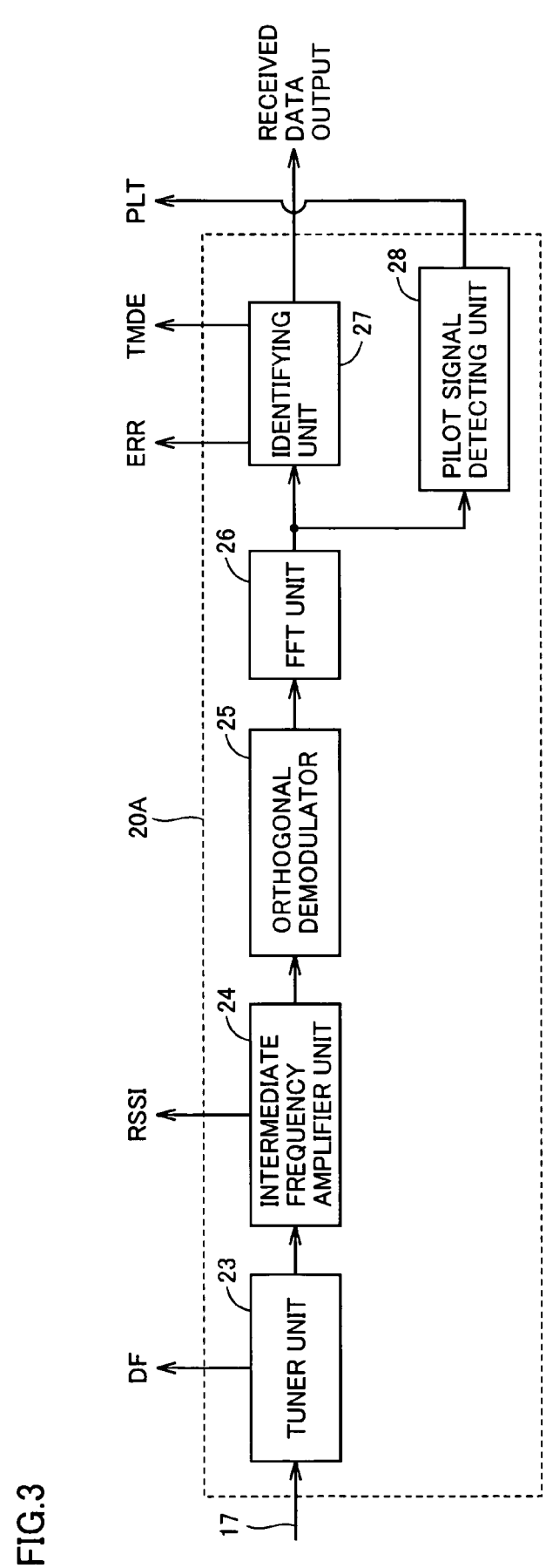
FIG. 3 is a schematic block diagram of a first example of a receiving circuit shown in FIG. 1.

FIG. 3 is a schematic block diagram showing a first example of receiving circuit 20 shown in FIG. 1. Referring to FIG. 3, a receiving circuit 20A, which is a first example of receiving circuit 20, includes a tuner unit 23, an intermediate frequency amplifier unit 24, an orthogonal demodulator 25, an FFT (Fast Fourier Transform) unit 26, an identifying unit 27 and a pilot signal detecting unit 28. Receiving circuit 20A is employed in the case where radio signals arriving at array antenna 10 are digital television signals. The digital television signals are digital signals modulated by OFMD (Orthogonal Frequency Division Multiplex).

Tuner unit 23 receives the received signal from coaxial cable 17, and performs high-frequency amplification, frequency conversion and others on the received signal. Tuner unit 23 detects the frequency of the received signal, and provides the received signal thus converted to intermediate frequency amplifier unit 24. Tuner unit 23 provides the detected frequency of the received signal as frequency setting signal DF to memory 41 of reactance setting unit 40 and priority renewal control unit 43.

Intermediate frequency amplifier unit 24 receives the received signal from tuner unit 23, and amplifies the received signal to detect a received signal strength RSSI. Intermediate frequency amplifier unit 24 provides, as received signal quality QRS, received signal strength RSSI thus detected to switch control unit 30 and priority renewal control unit 43, and provides the amplified received signal to orthogonal demodulator 25.

Orthogonal demodulator 25 demodulates the orthogonal modulation of the signal, which is received from intermediate frequency amplifier unit 24 and is modulated by the orthogonal frequency division multiplex, and provides it to FFT unit 26.

FFT unit 26 effects fast Fourier transformation on the signal provided from orthogonal demodulator 25, and provides the signal thus transformed to identifying unit 27 and pilot signal detecting unit 28.

Identifying unit 27 effects error correction on the signal provided from FFT unit 26, detects an error rate ERR of the received signal, and outputs, as the received data, the signal subjected to the error correction. Identifying unit 27 detects transmission mode TMDE based on the signal provided from FFT unit 26, and at the same time, provides error rate ERR and transmission mode TMDE thus detected to switch control unit 30 and priority renewal control unit 43 as received signal quality QRS.

Pilot signal detecting unit 28 detects a pilot signal PLT included in the signal provided from FFT unit 26, and provides pilot signal PLT thus detected to switch control unit 30 and priority renewal control unit 43 as received signal quality QRS. Pilot signal PLT is a signal, which is allocated to a specific sub-carrier in the orthogonal frequency division multiplex, and does not display audio and image data.

As described above, receiving circuit 20A receives the received signal, which is received by array antenna 10, via coaxial cable 17, and provides the received data by effecting amplification, demodulation and others on the received signal thus received. Also, receiving circuit 20A provides received signal strength RSSI, error rate ERR, transmission mode TMDE and pilot signal PLT, which are detected during the course of obtaining the received data, to switch control unit 30 and priority renewal control unit 43 as received signal quality QRS.

Figure 4:
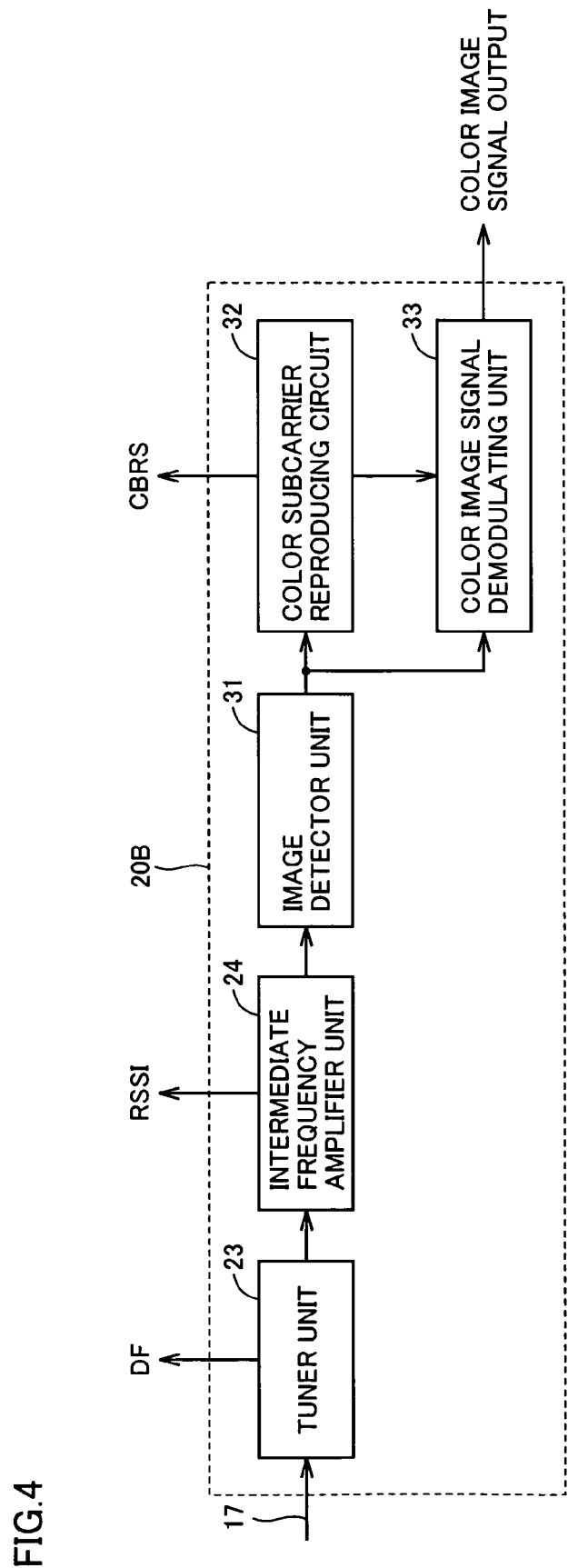
FIG. 4 is a schematic block diagram of a second example of the receiving circuit shown in FIG. 1.

FIG. 4 is a schematic block diagram of a second example of receiving circuit 20 shown in FIG. 1. Referring to FIG. 4, a receiving circuit 20B, which is a second example of receiving circuit 20, includes tuner unit 23, intermediate frequency amplifier unit 24, an image detector unit 31, a color subcarrier reproducing circuit 32 and a color image signal demodulating unit 33. Receiving circuit 20B is employed in the case where radio signals arriving at array antenna 10 are analog television signals.

Tuner unit 23 receives an NTSC composite signal from coaxial cable 17, and effects high-frequency amplification, frequency conversion and others on the received NTSC composite signal. Thereby, tuner unit 23 detects the frequency of the NTSC composite signal, and provides the converted NTSC composite signal to intermediate frequency amplifier unit 24. Tuner unit 23 provides the detected frequency of the NTSC composite signal to memory 41 of reactance setting unit 40 and priority renewal control unit 43 as frequency setting signal DF.

Intermediate frequency amplifier unit 24 receives the NTSC composite signal from tuner unit 23, and amplifies the received NTSC composite signal to detect received signal strength RSSI. Intermediate frequency amplifier unit 24 provides received signal strength RSSI thus detected as received signal quality QRS to switch control unit 30 and priority renewal control unit 43, and provides the amplified NTSC composite signal to image detector unit 31.

Image detector unit 31 receives the NTSC composite signal from intermediate frequency amplifier unit 24, and detects a composite signal by amplifying and demodulating the received NTSC composite signal. Image detector unit 31 provides the detected composite signal to color subcarrier reproducing circuit 32 and color image signal demodulating unit 33.

Color subcarrier reproducing circuit 32 detects a color burst signal CBRS of 3.58 MHz contained in the composite signal provided from image detector unit 31, and provides color burst signal CBRS thus detected to switch control unit 30 and priority renewal control unit 43 as received signal quality QRS. Color subcarrier reproducing circuit 32 reproduces the color subcarrier of 3.58 MHz included in the composite signal by using detected color burst signal CBRS, produces a color subcarrier signal synchronized with the color subcarrier, and provides it to color image signal demodulating unit 33.

Color image signal demodulating unit 33 effects orthogonal demodulation on the composite signal provided from image detector unit 31 by using the color subcarrier signal provided from color subcarrier reproducing circuit 32, and provides the color image signal.

As described above, receiving circuit 20B receives the NTSC composite signal received by array antenna 10 via coaxial cable 17, and effects the amplification, demodulation and others on the received NTSC composite signal to provide the color image signal. Also, receiving circuit 20B provides received signal strength RSSI and color burst signal CBRS, which are detected during the course of obtaining the color image signal, to switch control unit 30 and priority renewal control unit 43 as received signal quality QRS.

According to the invention, therefore, received signal quality QRS is formed of one of the followings:

(a) Received signal strength RSSI of the radio signal
(b) Bit error rate of the radio signal
(c) Frame error
(d) Detection/non-detection of the pilot signal, or detection level of the pilot signal
(e) Detection/non-detection of the color burst signal
(f) Logical AND between received signal strength RSSI and one of the above items (a)-(e)

If received signal strength RSSI is small, images on the television screen are disturbed. Therefore, received signal strength RSSI represents received signal quality QRS. If the bit error rate is large, images on the television screen deteriorates. Therefore, the bit error rate represents received signal quality QRS.

The frame is a collection of a predetermined number of screens, and deterioration occurs on the screen when the frame error is continuously detected N or more times. Therefore, received signal quality QRS is also represented by the detection and non-detection of the fact that the frame error continues N or more times. The determination of whether the frame error continues N or more times or not is performed by determining whether switch control unit 30 receives error rate ERR from receiving circuit 20A in each of operations of demodulating the N frames or not.

As described above, pilot signal PLT is allocated to a specific subcarrier in the OFDM scheme, and does not display audio data and image data so that the detection/non-detection of pilot signal PLT or the detection level of pilot signal PLT represents received signal quality QRS of the radio signal formed of the digital television signal.

Color burst signal CBRS is included in the analog television signal, and is used for displaying color images as described above. Therefore, when the received analog television signal contains color burst signal CBRS, the quality of the received signal is high. However, when the received analog television signal does not contain color burst signal CBRS, the quality of the received signal is low. Therefore, the presence/absence of the color burst signal CBRS in the analog television signal represents received signal quality QRS.

Receiving circuit 20 provides, as received signal quality QRS, one of the above items (a)-(f) to switch control unit 30 and priority renewal control unit 43. Switch control unit 30 receives one of the items (a)-(f) as received signal quality QRS, and compares received signal quality QRS thus received with threshold Qth.

Threshold Qth is fixed in some cases, and is variable in the other cases. When threshold Qth is fixed, switch control unit 30 compares received signal quality QRS provided from receiving circuit 20 with threshold Qth, and operates in accordance with the result of this comparison to hold or switch the connections of switches S1 and S2.

When threshold Qth is variable, switch control unit 30 determines the value itself of received signal quality QRS, which is received from receiving circuit 20, and changes threshold Qth in accordance with the result of this determination.

More specifically, when received signal quality QRS is formed of received signal strength RSSI, switch control unit 30 determines whether received signal strength RSSI is relatively large or small. When received signal strength RSSI is relatively small, switch control unit 30 sets a relatively low threshold Qth_L. When received signal strength RSSI is relatively large, switch control unit 30 sets a relatively high threshold Qth_H. Switch control unit 30 may change threshold Qth in accordance with a relative magnitude of an average of received signal strength RSSI.

The above is true also with respect to other received signal qualities QRS.

As described above, when threshold Qth is variable, switch control unit 30 determines the value itself of received signal quality QRS provided from receiving circuit 20, and changes threshold Qth according to the result of the determination for comparing the received signal quality QRS with threshold Qth thus changed. When received signal quality QRS is smaller than changed threshold Qth, switch control unit 30 switches the connections in switches S1 and S2. Thereby, array antenna 10 receives the reactance values, which are different from the reactance values before the switching of switches S1 and S2, on varactor diodes 14 and 16, and thereby changes the directivity for receiving the radio signals. The directivity thus changed is maintained for a constant period.

Description will now be given on timing of switching of switches S1 and S2 by switch control unit 30. Switch control unit 30 switches the connections in switches S1 and S2 according to the following timing.

(T1) Arbitrary Timing
(T2) After elapsing of a predetermined period from last switching
(T3) Timing synchronized with frame
(T4) Vertical interval The arbitrary timing is a timing in such a case that GOP (Group Of Pictures), for which the reactance values were switched (i.e., the directivity of array antenna 10 was switched), is abandoned, and the last screen images are displayed. Since the GOP, for which the reactance values were switched, is abandoned, the reactance values can be switched according to arbitrary timing.

The timing of "after elapsing of a constant period from the last switching" is employed in the following case. If the reactance values are frequently switched after the reactance values were once switched (i.e., the directivity of array antenna 10 was once switched), images of high quality and images of low quality are continuously displayed on the screen in some cases. For displaying the images of substantially constant quality, therefore, the reactance values are switched after elapsing of a constant period. Thus, the directivity, which was once selected by switching, will be maintained for a constant period.

The timing synchronized with the frame is employed for switching the reactance values in synchronization with the timing of screen display.

The timing of vertical interval is employed for switching the reactance values during switching of the screen images in the case where the radio signals are analog television signals. In this case, switch control unit 30 receives a vertical interval signal from a display unit (screen), and detects the period between certain switching and next switching of the screen images based on the received vertical internal signal.

Description will now be given on the timing for setting threshold Qth in switch control unit 30. Threshold Qth is set in switch control unit 30 according to the timing defined by one of the following times:

(ST1) Design of the television
(ST2) Shipment from a factory
(ST3) Renewal of table TBL
(ST4) Switching of broadcasting mode A whole operation of receiver 100 will now be described.

When the radio signal formed of the digital or analog television signal arrives at receiver 100, array antenna 10 receives the radio signal with the directivity set by reactance value set [x11, x12] or [x21, x22] determined for each of frequencies f1-fm, and provides the received signal to receiving circuit 20 via coaxial cable 17.

When receiving circuit 20 receives the digital television signal, receiving circuit 20A operates as described above, and thus demodulates the received signal to provide the demodulated signal (received data). Also, receiving circuit 20A detects received signal quality QRS and frequency setting signal DF, provides received signal quality QRS to switch control unit 30 and priority renewal control unit 43, and provides frequency setting signal DF to memory 41 and priority renewal control unit 43.

Memory 41 reads the reactance value set (one of RV1-RVm) corresponding to the received frequency (one of received frequencies f1-fm) represented by frequency setting signal DF, and provides the reactance value set thus read to voltage supply circuit 42.

Voltage supply circuit 42 supplies voltages V11, V21, V12 and V22 for achieving the reactance value set received from memory 41 to terminals 18, 19, 21 and 22, respectively.

Switch control unit 30 compares received signal quality QRS received from receiving circuit 20 with threshold Qth. When received signal quality QRS is equal to or greater than threshold Qth, switch control unit 30 provides holding signal HLD to switches S1 and S2 in accordance with timing of one of the above items (T1)-(T4). When received signal quality QRS is smaller than threshold Qth, switch control unit 30 provides switching signal EXC to switches S1 and S2 in accordance with timing of one of the above items (T1)-(T4).

Switches S1 and S2 maintain the connection in accordance with holding signal HLD received from switch control unit 30, or switch the connections in accordance with switching signal EXC. Thereby, the directivity of array antenna 10 is switched at each of frequencies f1-fm to achieve received signal quality QRS equal to or greater than threshold Qth. Receiver 100 can receive and demodulate the radio signals (digital or analog television signals) such that the incoming radio signal may provide received signal quality QRS equal to or greater than threshold Qth at all the band frequencies formed of frequencies f1-fm. Consequently, receiver 100 can receives the radio signal with high sensitivity over a wide frequency range.

Priority renewal control unit 43 receives received signal quality QRS and frequency setting signal DF from receiving circuit 20, and receives an ON or OFF signal from a power supply (not shown) of receiver 100. Priority renewal control unit 43 performs the foregoing operations to renew reactance value sets ([x11, x12], [x21, x22])f1, ([x11, x12], [x21, x22])f2, . . . and ([x11, x12], [x21, x22])fm in any one of such cases that it receives the ON signal (GT1), that it receives the OFF signal (GT2), and that received signal quality QRS continuously becomes lower than threshold Qth N times (GT3).

Thereby, the radio signals can be received over a wide range of frequency while appropriately renewing the reactance value sets stored in memory 41.

Figure 5:
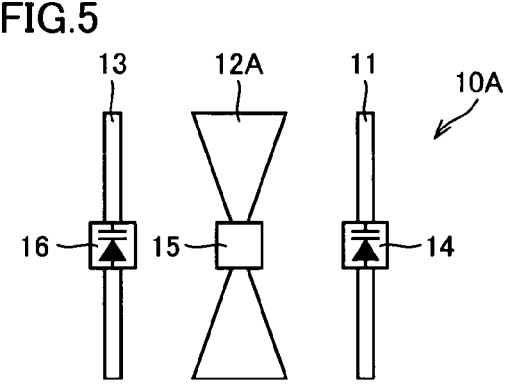
FIG. 5 is a plan showing another structure of an array antenna shown in FIG. 1.

FIG. 5 is a plan showing another structure of array antenna 10 shown in FIG. 1. Referring to FIG. 5, an array antenna 10A is the same as array antenna 10 shown in FIG. 1 except for that antenna element 12 is replaced with an antenna element 12A. Antenna element 12A includes feeder circuit 15, and antenna elements each having a substantially sectorial form are arranged on the opposite sides of feeder circuit 15 instead of the pole-like antenna elements, respectively. As described above, antenna element 12A forming the feeder element has a form diverging oppositely from feeder circuit 15, and thereby the directivity of array antenna 10A can be changed to a large extent by the reactance values of antenna elements 11 and 13.

Figure 6:
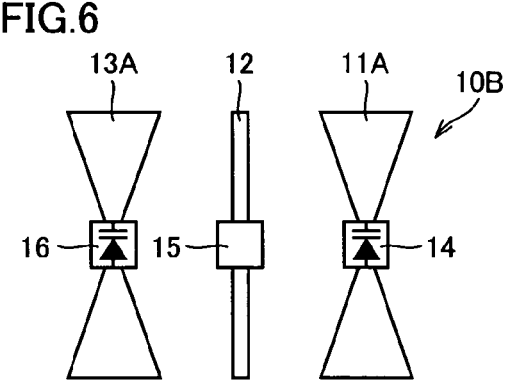
FIG. 6 is a plan showing still another structure of an array antenna shown in FIG. 1.

FIG. 6 is a plan showing still another structure of array antenna 10 shown in FIG. 1. Referring to FIG. 6, an array antenna 10B is the same as array antenna 10 except for that antenna elements 11A and 13A are employed instead of antenna elements 11 and 13.

Antenna element 11A includes varactor diode 14 and antenna elements, which are arranged on the opposite sides of varactor diode 14 instead of the pole-like antenna elements, respectively, and each have a substantially sectorial form. Antenna element 13A includes varactor diode 16 and antenna elements, which are arranged on the opposite sides of varactor diode 16 instead of the pole-like antenna elements, respectively, and each have a substantially sectorial form. As described above, each of passive elements, i.e., antenna elements 11A and 13A is formed of the antenna elements, which diverge oppositely from corresponding varactor diode 14 or 16, and thereby it is possible to change the directivity of array antenna 10B to a large extent depending on the reactance values of the passive elements, i.e., antenna elements 11A and 13A.

Figure 7:
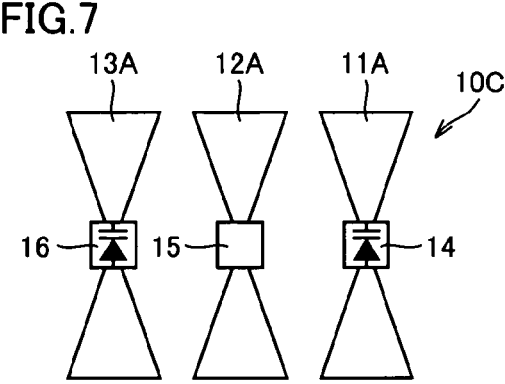
FIG. 7 is a plan showing still another structure of an array antenna shown in FIG. 1.

FIG. 7 is a plan showing further another structure of array antenna 10 shown in FIG. 1. Referring to FIG. 7, an array antenna 10C is the same as array antenna 10 except for that antenna elements 11A, 12A and 13A are employed instead of antenna elements 11, 12 and 13, respectively. Thus, array antenna 10C is a combination of array antennas 10A and 10B. In this structure, the feeder element, i.e., antenna element 12A is formed of antenna elements diverging oppositely from feeder circuit 15. Also, each of passive elements, i.e., antenna elements 11A and 13A is formed of the antenna elements diverging oppositely from corresponding varactor diode 14 or 16. Thereby, it is possible to change the directivity of array antenna 10C to a large extent depending on the reactance values of passive elements, i.e., antenna elements 11A and 13A.

Figure 8A:
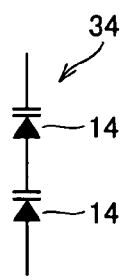
FIGS. 8A and 8B are plans of two varactor diodes connected in series.
Figure 8B:
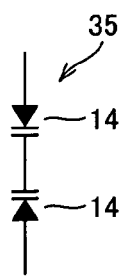

FIGS. 8A and 8B are plans of two varactor diodes connected in series. Referring to FIG. 8A, a varactor diode 34 is formed of two varactor diodes 14 connected in series in the forward direction. Referring to FIG. 8B, a varactor diode 35 is formed of two varactor diodes 14 connected in series in the reverse direction.

Varactor diodes 34 and 35 can be used in array antennas 10, 10A, 10B and 10C instead of varactor diodes 14 and 16. By using the two varactor diodes connected in series in each of antenna elements 11, 11A, 13 and 13A of array antennas 10, 10A, 10B and 10C, the range of the reactance value becomes double so that the directivities of array antennas 10, 10A, 10B and 10C can be changed to a large extent depending on the reactance values of antenna elements 11, 11A, 13 and 13A.

Receiver 100 may employ any one of foregoing array antennas 10A, 10B and 10C, and may also employ any one of array antennas 10, 10A, 10B and 10C provided with varactor diodes 34 and 35.

It has been described that each of array antennas 10, 10A, 10B and 10C is formed of one feeder element and two passive elements. According to the invention, however, it is merely required that the array antenna is formed of one feeder element and at least one passive element.

Figure 9:
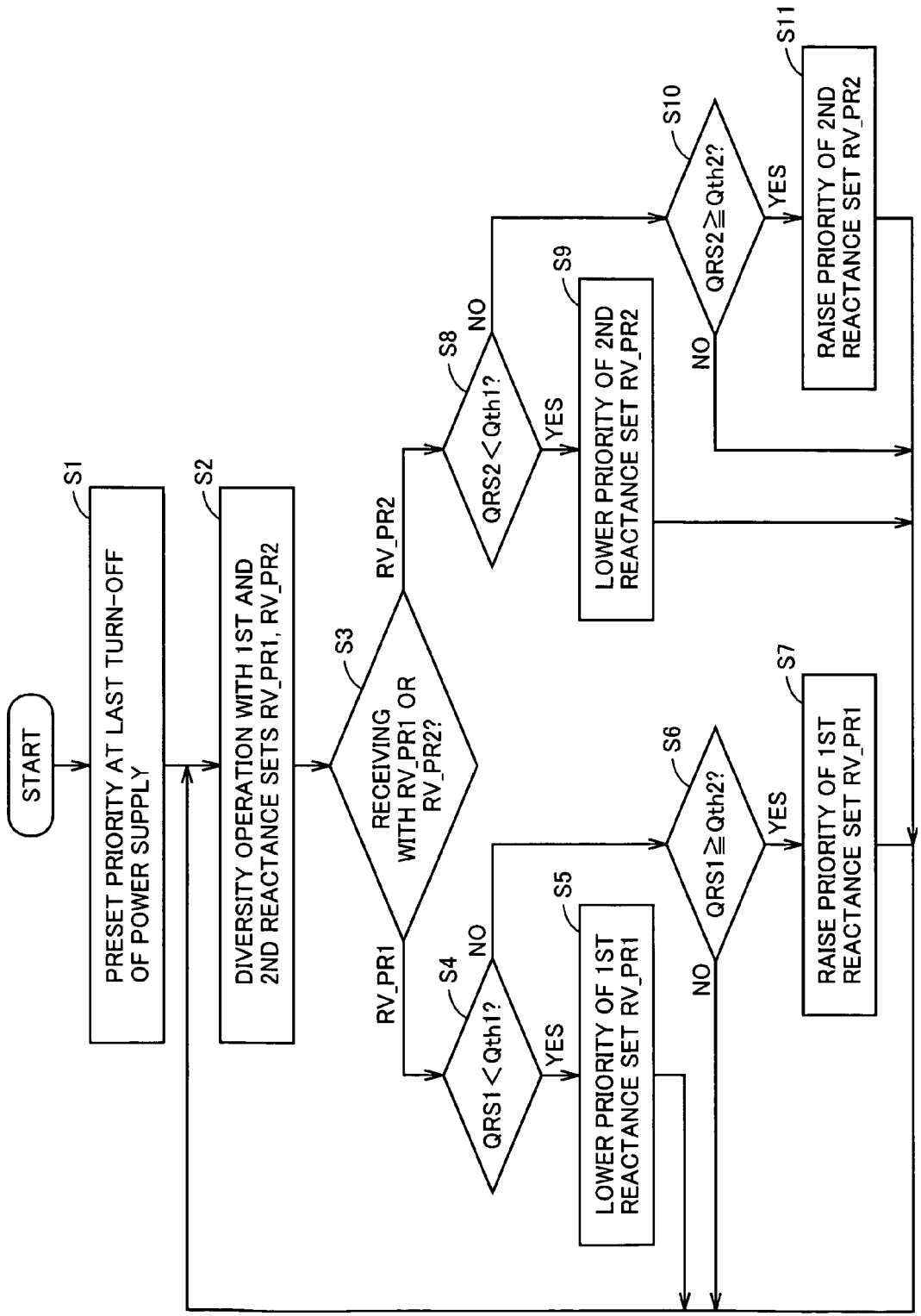
FIG. 9 is a flowchart illustrating an operation of renewing a set of reactances in a priority renewal control unit shown in FIG. 1.

Priority renewal control unit 43 may renew reactance value sets RV1-RVm stored in memory 41 in the following manner. FIG. 9 is a flowchart illustrating an operation of renewing the reactance value sets by priority renewal control unit 43 shown in FIG. 1. According to the method of renewing the reactance value sets illustrated in FIG. 9, processing of predetermining the reactance value sets, which can be used with current radio wave environments and frequency of receiver 100, is effected on the three of more sets of the reactance values. Priorities are assigned to the three or more reactance value sets, respectively. These priorities are defined not by the order but by scores or the like. Therefore, if the degree of priority is relatively changed, the priority order of the reactance value set in question with respect to preceding and following reactance value sets changes in some cases, and does not change in the other case.

When a series of operations starts, the priority, which was kept at the time of last turn-off of receiver 100, is preset (step S1). Using the priority preset in step S1, switching operation (diversity operation) is effected with the reactance value sets RV_PR1 and RV_PR2 in the first and second ranks of the priorities (step S2).

Thereafter, it is determined whether the signal is being received with reactance value set RV_μL or RV_PR2 in the first or second rank or not (step S3). If the signal is being received with reactance value set RV_PR1 in the first rank, it is further determined whether received signal quality QRS1 (a kind of received signal quality QRS already described) is smaller than a threshold Qth1 or not (step S4).

If received signal quality QRS1 is smaller than threshold Qth1, the priority of reactance value set RV_PR1 in the first rank is lowered (step S5), and then a series of operations starts from step S2.

If received signal quality QRS1 is equal to or greater than threshold Qth1 in step S4, it is further determined whether received signal quality QRS1 is equal to or greater than a threshold Qth2 (>Qth1) or not (step S6). If received signal quality QRS1 is equal to or greater than threshold Qth2, the degree of priority of reactance value set RV_PR1 in the first rank is raised (step S7). If received signal quality QRS1 is smaller than threshold Qth2, the series of operations returns to step S2.

When it is determined in step S3 that the signal is being received with reactance value set RV_PR2 in the second rank, it is further determined whether received signal quality QRS2 (a kind of received signal quality QRS already described) is smaller than threshold Qth1 or not (step S8).

If received signal quality QRS2 is smaller than threshold Qth1, the degree of priority of reactance value set RV_PR2 is lowered (step S9), and thereafter, the series of operations returns to step S2.

If it is determined in step S8 that received signal quality QRS2 is equal to or greater than threshold Qth1, it is further determined whether received signal quality QRS2 is equal to or greater than threshold Qth2 or not (step S10). If received signal quality QRS2 is equal to or greater than threshold Qth2, the degree of priority of reactance value set RV_PR2 in the second rank is raised (step S11). If received signal quality QRS2 is smaller than threshold Qth2, the series of operations returns to step S2.

In this manner, priority renewal control unit 43 predetermines the reactance value set, which can be used with the current radio wave environment and frequency of receiver 100, and renews the reactance value sets ([x11, x12], [x21, x22])f1, ([x11, x12], [x21, x22])f2, . . . and ([x11, x12], [x21, x22])fm stored in memory 41 by using the priorities thus determined in accordance with the timing of any one of the foregoing cases (GT1)-(GT3).

Priority renewal control unit 43 sets all the reactance value sets ([x11, x12], [x21, x22])f1, ([x11, x12], [x21, x22])f2, . . . and ([x11, x12], [x21, x22])fm in respective frequencies f1-fm in antenna elements 11 and 13, and measures the received signal qualities QRS. After assigning priorities to all the reactance value sets ([x11, x12], [x21, x22])f1, ([x11, x12], [x21, x22])f2, . . . and ([x11, x12], [x21, x22])fm, priority renewal control unit 43 changes the priorities assigned to the respective reactance value sets in accordance with a flowchart illustrated in FIG. 9. In this manner, it is preferable to predetermine the reactance value sets, which can be used with the current radio wave environments and frequency of receiver 100.

It has been described that priority renewal control unit 43 renews reactance value sets RV1-RVm stored in memory 41 when the power of receiver 100 is turned off, when the power of receiver 100 is turned on, and when received signal quality QRS continuously becomes lower than threshold Qth N times. However, the invention is not restricted to this, and such a manner may be employed that when the power of receiver 100 is turned on, reactance value sets RV1-RVm stored in memory 41 are renewed in the foregoing manner, and thereafter, reactance value sets RV1-RVm thus renewed will be maintained. Also, such a manner may be employed that when the power of receiver 100 is turned on, reactance value sets RV1-RVm stored in memory 41 are renewed in the foregoing manner, and thereafter, reactance value sets RV1-RVm will be renewed in the foregoing method at constant intervals.

Priority renewal control unit 43 may renew reactance value sets RV1-RVm in the foregoing method when transmission mode TMDE of the radio signal is switched. Also, priority renewal control unit 43 may renew reactance value sets RV1-RVm stored in memory 41 when radio wave environments around receiver 100 change.

When such a state is detected that received signal quality QRS continuously becomes lower than threshold Qth N times, or when movement of receiver 100 is detected, it is determined that change occurred in radio wave environment around receiver 100.

When occurrence of an acceleration in receiver 100 is detected, when change in direction of receiver 100 with respect to the earth's magnetic is detected or when change in position of receiver 100 is detected by a GPS (Global Positioning System), it is determined that the movement of receiver 100 occurred.

It has been described that there are two reactance value sets ([x11, x12], [x21, x22]) for each of frequencies f1-fm. However, the invention is not restricted to this, and the number of the reactance value sets, which are set for each of frequencies f1-fm, may be determined arbitrarily.

Further, reactance setting unit 40 forms a "directivity pattern setting unit".

Further, switch control unit 30 forms a "directivity switching unit".

Second Embodiment

Figures 10, 11:
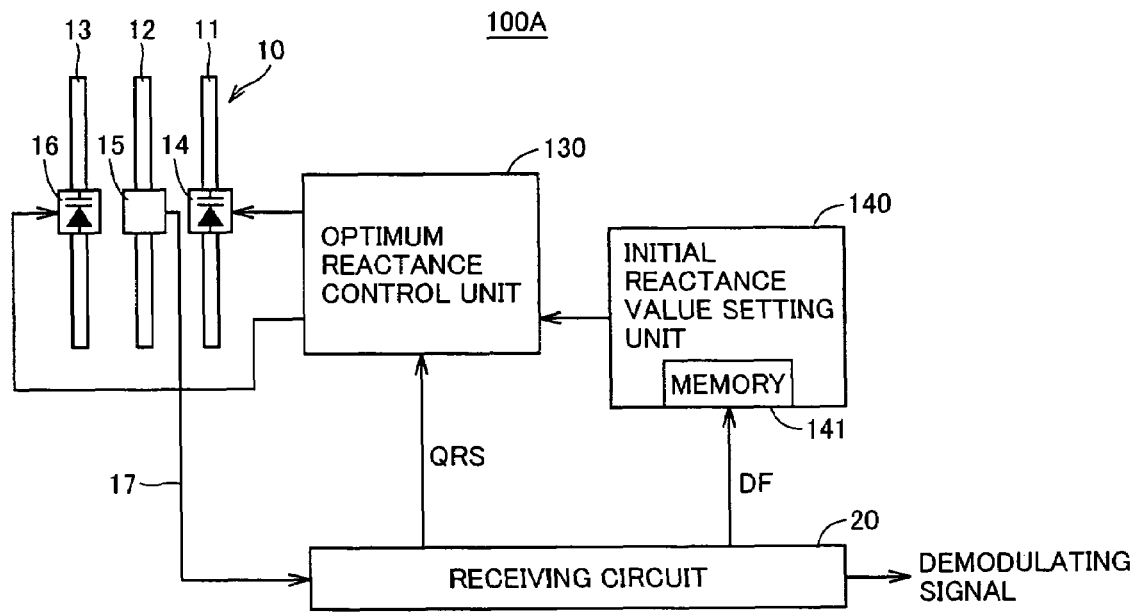
FIG. 10 is a schematic block diagram of a receiver according to a second embodiment.
FIG. 11 schematically illustrates a table stored in a memory shown in FIG. 10.

FIG. 10 is a schematic block diagram of a receiver according to a second embodiment. Referring to FIG. 10, a receiver 100A according to the second embodiment is the same as receiver 100 shown in FIG. 1 except for that an optimum reactance control unit 130 is employed instead of switch control unit 30 of receiver 100 in FIG. 1, and an initial reactance value setting unit 140 is employed instead of reactance setting unit 40 in FIG. 1.

Optimum reactance control unit 130 receives received signal quality QRS from receiving circuit 20, and receives an initial value of the reactance for each of frequencies f1-fm from initial reactance value setting unit 140. Optimum reactance control unit 130 compares received signal quality QRS with threshold Qth. When received signal quality QRS is smaller than threshold Qth, optimum reactance control unit 130 determines the optimum reactance value in a manner, which will be described later, by using the initial value of the reactance received from initial reactance value setting unit 140, and supplies the optimum reactance value thus determined to antenna elements 11 and 13 (passive elements) of array antenna 10.

Initial reactance value setting unit 140 includes a memory 141. FIG. 11 is a schematic diagram of a table stored in memory 141 shown in FIG. 10. Referring to FIG. 11, a table TBLI is formed of received frequencies f1-fm and sets RV1_int-RVM_int of the initial reactance values. Sets RV1_int-RVm_int of the initial reactance values correspond to received frequencies f1-fm, respectively. Sets RV1_int-RVm_int of the initial reactance values are formed of ([x11_int, x12_int], [x21_int, x22_int])f1, ([x11_int, x12_int], [x21_int, x22_int])f2, and ([x11_int, x12_int], [x21_int, x22_int])fm, respectively. Thus, each of sets RV1_int-RVm_int of the reactance initial values is formed of two initial values.

As described above, memory 141 stores table TBLI representing the correspondence between respective frequencies f1-fm and sets RV1_int-RVm_int of the reactance initial values for calculating reactance value sets RV1-RVm, which provide received signal quality QRS equal to or greater than threshold Qth in respective frequencies f1-fm.

When memory 141 receives frequency setting signal DF from receiving circuit 20, memory 141 reads the initial value set RV1_int-RVm_int corresponding to the received frequency f1-fm indicated by frequency setting signal DF, and provides the initial value set thus read to optimum reactance control unit 130.

Figure 12:
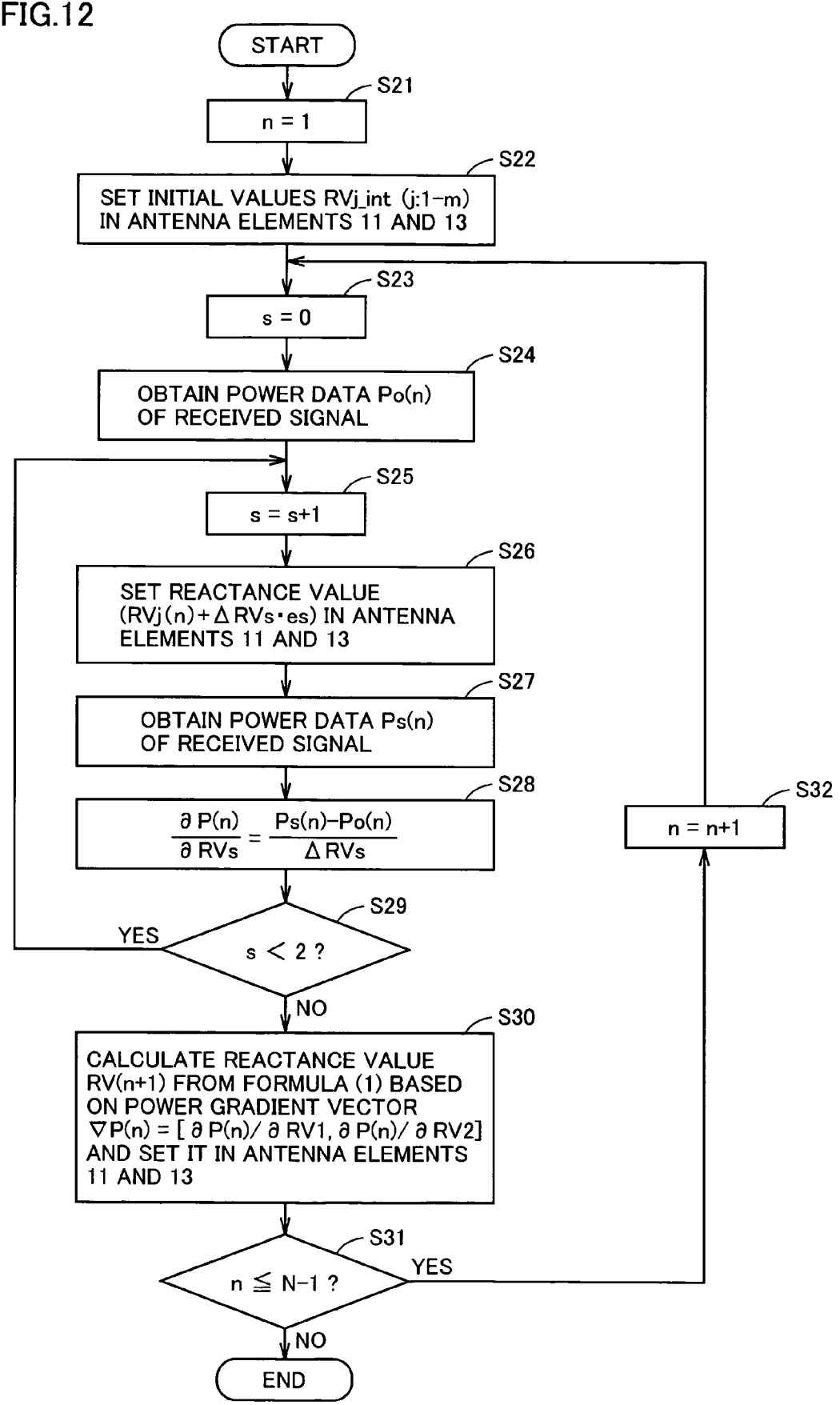
FIG. 12 is a flowchart illustrating a method of determining an optimum reactance value in an optimum reactance control unit shown in FIG. 10.

FIG. 12 is a flowchart illustrating a method of determining or deciding the optimum reactance values by optimum reactance control unit 130 shown in FIG. 10. In the description of the manner of determining the optimum reactance values, RV(n) represents a set of the reactance values of antenna elements 11 and 13 at a time n (or times of repetition of processing). The set of the reactance values is an S-dimensional set, where S is the number of passive elements 11 and 13, and is equal, e.g., to two.

According to an algorithm of maximum gradient method, a renewed value RV(n+1) of the reactance value set at a time (n+1) can be calculated according to a simple recursive relationship expressed by the following formula:

$$RV(n+1)=RV(n)+\mu \times \nabla P(n)/P(n) \quad (1)$$

where a parameter $\mu$ is a constant of a positive real number controlling a speed of convergence, and $\nabla P(n)$ is a gradient of an electric power P(n) of the received signal. Power P(n) is a function of reactance value set RV(n).

When a series of operations starts, an iterative parameter n is set to one (step S21). Reactance initial values RVj_int (j: 1-m) are set in antenna elements 11 and 13 (step S22). Thereafter, parameter s (s: 0-2) is set to zero (step S23). Optimum reactance control unit 130 obtains power data $P_0(n)$ of received signal from receiving circuit 20 (step S24), and increments parameter s by one (step S25).

After step S25, optimum reactance control unit 130 sets reactance value $(RVj(n)+\Delta RV_s \cdot e_s)$ in antenna elements 11 and 13 (step S26). The above "$e_s$" represents a two-dimensional vector, in which only an sth component is "1", and all the other components are "0". Perturbation $\Delta RV_s \cdot e_s$ of the reactance value pertubates the reactance values of antenna elements 11 and 13.

Receiving circuit 20 measures the power of the radio signal (received signal) received by array antenna 10, in which reactance value $(RVj(n)+\Delta RV_s \cdot e_s)$ is set, and optimum reactance control unit 130 obtains power data $P_s(n)$ of the received signal from receiving circuit 20 (step S27).

Thereafter, optimum reactance control unit 130 calculates a power gradient ($\partial P(n)/\partial RV_s$) by using the following equation (step S28).

$$\partial P(n)/\partial RV_s = (P_s(n)-P_0(n))/\Delta RV_s \quad (2)$$

It is determined whether all gradients $\partial P(n)/\partial RV_s$ for respective reactance values $RV_s$ are calculated or not (step S29). When it is determined that all gradients $\partial P(n)/\partial RV_s$ for respective reactance values $RV_s$ are not calculated, foregoing steps S25-S29 are repeated.

When it is determined in step S29 that all gradients $\partial P(n)/\partial RV_s$ for respective reactance values $RV_s$ are calculated, optimum reactance control unit 130 calculates reactance value set RV(n+1) from the formula (1) based on the power gradient vector $\nabla P(n)$, and sets it in antenna elements 11 and 13 (step S30).

It is determined whether repetition times n are equal to or less than predetermined number N or not (step S31). When repetition times n are equal to or less than predetermined number N, (n=n+1) is set (step S32), and then foregoing steps S23-S31 are repeated. When it is determined in step S31 that the repetition times n are larger than predetermined number N, a series of operations ends. According to the flowchart illustrated in FIG. 12, the sets of the optimum reactance values for respective frequencies f1-fm are set in antenna elements 11 and 13.

As described above, when received signal quality QRS is smaller than threshold Qth, receiver 100A calculates the optimum reactance values by using reactance initial values RV1_int-RVm_int set for respective frequencies f1-fm, and sets the optimum reactance values in antenna elements 11 and 13. Thus, receiver 100A sets the directivity of array antenna 10 such that received signal quality QRS may attain or exceed threshold Qth, and receives the radio signals with the directivity thus set.

In receiver 100A, array antenna 10 may be selectively replaced with various array antennas already described and shown in FIGS. 5-8A and 8B.

Structures and operations other than the above are the same as those of the first embodiment.

Although the first and second embodiments have been described in connection with the television set receiving the television signals, the invention is not restricted to it, and may be applied to general receivers other than the television set. Such general receivers include a car-mounted FM radio receiver, a receiver of a cellular phone (a receiving circuit of a mobile station device) and others.

When the invention is applied to a general receiver, the receiver has the same structure as that shown in FIG. 1, and one of the foregoing items (a), (b), (c), (d) and (f) may be used as received signal quality QRS. In this case, the frame error in the item (c) refers to occurrence of bit errors in a data block defined by handling tens to thousands of bits as a unit. Switch control unit 30 changes the connections in switches S1 and S2 according to the switching timing of one of the foregoing items (T1)-(T3).

In the radio transmission method, a guard time or preamble period, for which a transmission signal is stopped or modulated with a specific known signal, and information data is not transmitted, is often provided on a frame-by-frame basis. Accordingly, by setting the switching timing of switches S1 and S2 in the guard time or preamble period, received signal quality QRS can be improved.

In the case of the transmission method, in which radio signals are transmitted together with error correction codes added thereto, likelihood information or a syndrome number, which is obtained in the processing of decoding the error correction code, may be used as received signal quality QRS. In this case, when a reception state becomes worse due to fading, a bit error may occur before error correction, and thereby error correction is performed. Further, correct decoding may be eventually performed. In these cases, the antennas can be switched by detecting the change in likelihood information or syndrome number. Accordingly, such a reception state can be prevented that an error remains because it exceeds a limit of error correction, and the antenna switching can be started before the occurrence of the error. Therefore, the reception performance is further improved.

Third Embodiment

Figures 13, 14:
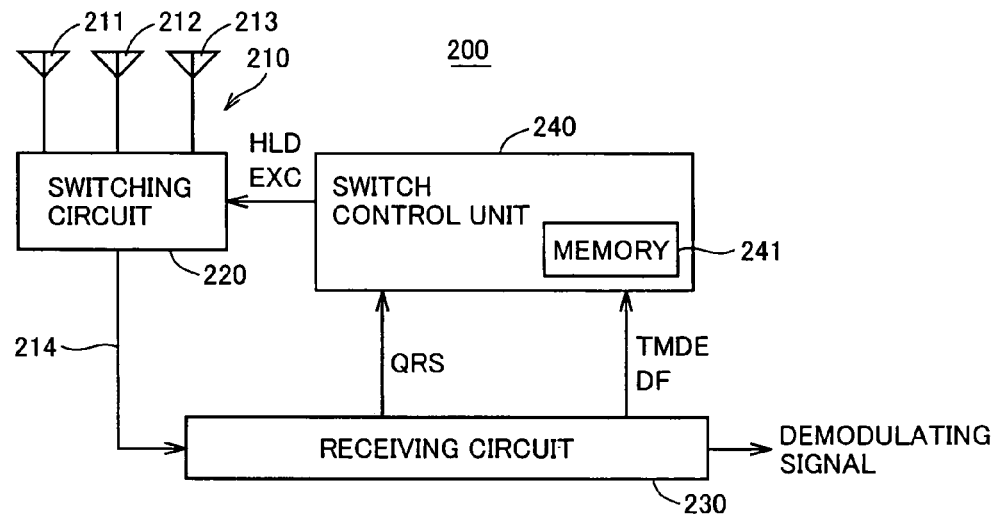
FIG. 13 is a schematic block diagram of a receiver according to a third embodiment.
FIG. 14 schematically illustrates a table stored in a memory shown in FIG. 13.

FIG. 13 is a schematic block diagram of a receiver according to a third embodiment. Referring to FIG. 13, a receiver 200 according to the third embodiment includes an antenna device 210, a switching circuit 220, a receiving circuit 230 and a switch control unit 240.

Receiver 200 is, for example, included in a television set placed in a room or in a portable or car-mounted television set. Receiver 200 receives a television signal propagating in a frequency band formed of received frequencies f1-fm.

Antenna device 210 is formed of antennas 211-213. Antennas 211-213 can be targets of space diversity or directivity diversity. When these are targets of the space diversity, antennas 211-213 have different reception characteristics, and are arranged in positions spatially spaced from each other, respectively. When antennas 211-213 are targets of the directivity diversity, antennas 211-213 have different directivities from each other, respectively. Antennas 211-213 are connected to switching circuit 220.

Switching circuit 220 is connected to receiving circuit 230 via a coaxial cable 214. Switching circuit 220 holds the connection between the currently used antenna (one of antennas 211-213) and coaxial cable 214 in accordance with holding signal HLD provided from switch control unit 240, and also operates in accordance with switching signal EXC to switch the connection between the currently used antenna (one of antennas 211-213) and coaxial cable 214 to the connection between another antenna (one of antennas 211-213) indicated by switching signal EXC and coaxial cable 214.

Receiving circuit 230 receives a received signal from antenna device 210 via switching circuit 220, and demodulates the received signal to provide a demodulating signal. Receiving circuit 230 detects the frequency of the received signal, and provides the detected frequency to switch control unit 240 as frequency setting signal DF. Further, receiving circuit 230 produces received signal quality QRS indicating the quality of the received signal as well as a transmission mode detection signal TMDE indicating the transmission mode of the television signal, and provides them to switch control unit 240.

Switch control unit 240 include a memory 241. FIG. 14 schematically illustrates a table stored in memory 241 shown in FIG. 13. Referring to FIG. 14, table TBL is formed of transmission modes MDE1 and MDE2, received frequencies f1-fm and antenna selection information IF(ANT211-ANT213)f1-IF(ANT211-ANT213)fm. Received frequencies f1-fm are set in each of transmission modes MDE1 and MDE2. Antenna selection information IF(ANT211-ANT213)f1-IF(ANT211-ANT213)fm is provided corresponding to received frequencies f1-fm, respectively.

Antenna selection information IF(ANT211-ANT213)f1-IF(ANT211-ANT213)fm is formed of priorities for selecting the antenna, which is suitable for setting received signal quality QRS to or above threshold Qth, from antennas 211-213. Antenna selection information IF(ANT211-ANT213)f1-IF(ANT211-ANT213)fm is also formed of antenna designation information for designating antennas 211 and 212, which provide received signal quality QRS in or above a predetermined rank, among antennas 211-213.

As described above, memory 241 stores table TBL, in which antenna selection information IF(ANT211-ANT213)f1-IF(ANT211-ANT213)fm for selecting the antennas suitable for setting received signal quality QRS to or above threshold Qth is related to the respective transmission modes and respective frequencies f1-fm.

Referring to FIG. 13 again, memory 241 receives transmission mode detection signal TMDE and frequency setting signal DF from receiving circuit 230, and reads, from table TBL, the antenna selection information (i.e., one of antenna selection information items (IF(ANT211-ANT213)f1-IF(ANT211-ANT213)fm) corresponding to the transmission mode MDE1 or MDE2 and the received frequency (one of received frequencies f1-fm) indicated by received transmission mode detection signal TMDE and frequency setting signal DF. The antenna selection information thus read is provided to switch control unit 240.

Switch control unit 240 holds threshold Qth, and receives received signal quality QRS from receiving circuit 230. Switch control unit 240 compares received signal quality QRS with threshold Qth. When received signal quality QRS is equal to or greater than threshold Qth, switch control unit 240 issues holding signal HLD to switching circuit 220. When received signal quality QRS is lower than threshold Qth, switch control unit 240 selects the antenna, which provides received signal quality QRS equal to or greater than threshold Qth, in accordance with antenna selection information IF(ANT211-ANT213)f1-IF(ANT211-ANT213)fm provided from memory 241, and produces switching signal EXC for switching the antenna from the currently used antenna (one of antennas 211-213) to the selected antenna. Switch control unit 240 provides switching signal EXC thus produced to switching circuit 220.

Receiving circuit 230 is formed of receiving circuit 20A shown in FIG. 3 or receiving circuit 20B shown in FIG. 4.

When receiving circuit 230 is formed of receiving circuit 20A shown in FIG. 3, it receives the signal, which is received by antenna device 210, via coaxial cable 214, and effects amplification, modulation and others on the received signal to provide the received data. Also, receiving circuit 230 provides received signal strength RSSI, error rate ERR and pilot signal PLT, which are detected during the course of obtaining the received data, to switch control unit 240 as received signal quality QRS.

When receiving circuit 230 is formed of receiving circuit 20B shown in FIG. 4, it receives the NTSC composite signal, which is received by antenna device 210, via coaxial cable 214, and effects the amplification, demodulation and others on the received NTSC composite signal to provide a color image signal. Also, receiving circuit 230 provides received signal strength RSSI and color burst signal CBRS, which are detected during the course of obtaining the color image signal, to switch control unit 240 as received signal quality QRS.

In the third embodiment, therefore, received signal quality QRS is likewise formed of one of the items (a)-(f) already described.

In the third embodiment, it is determined whether the frame error continuously occurred N times or not, and this determination is performed by determining whether such a situation occurred or not that switch control unit 240 received error rate ERR from receiving circuit 230 during demodulation of each of N frames in the operation of demodulating and displaying the N frames on the screen.

Receiving circuit 230 provides one of the foregoing items (a)-(f) as received signal quality QRS to switch control unit 240. Switch control unit 240 receives one of the items (a)-(f) as received signal quality QRS, and compares received signal quality QRS thus received with threshold Qth.

In this case, threshold Qth is a variable. Switch control unit 240 holds threshold Qth while keeping a relationship with the reception conditions of the radio signals, i.e., the modulating method or the transmission speed of the radio signals. Switch control unit 240 determines the modulation method or the transmission speed based on transmission mode detection signal TMDE received from receiving circuit 230, and sets the threshold, which corresponds to the determined modulation method or transmission speed, as threshold Qth.

The threshold corresponding to the modulation method or transmission speed is set in switch control unit 240 at the time of design or shipment of receiver 200.

Switch control unit 240 may perform the threshold determining processing to determine the threshold for each modulating method or transmission speed, and may set the threshold thus determined as threshold Qth. This threshold determining processing is performed in such a manner that the connection between antennas 211-213 and coaxial cable 214 is switched while changing the threshold within a predetermined range, and the threshold providing the highest received signal quality QRS is determined in the course of such switching.

Switch control unit 240 performs the above threshold determining processing according to the following timing:

(GT1) when received signal quality QRS becomes lower than a low threshold Qth_L lower than threshold Qth N (N: natural number) or more times,
(GT2) when movement of receiver 200 is detected,
(GT3) when transmission mode TMDE of the radio signal is switched, and
(GT4) when the received frequency (channel) is switched.

The movement of receiver 200 is detected when occurrence of an acceleration in receiver 200 is detected, when change in direction of receiver 200 with respect to the earth's magnetic is detected or when change in position of receiver 200 is detected by the GPS.

The timing of switching antennas 211-213 by switch control unit 240 will now be described. Switch control unit 240 switches antennas 211-213 in accordance with the timing of one of the foregoing cases (T2)-(T4).

The timing (T2), according to which the switching is performed after a constant period elapses from the last switching, is employed because switching noises would often occur if the antennas were frequently switched after the antenna was once switched. For preventing frequent occurrence of switching noises, therefore, antennas 211-213 are switched after a constant period from the last switching.

The timing (T3) synchronized with the frame is employed for switching the reactance values in synchronization with the timing of screen display.

The timing (T4) of vertical interval is employed for switching the reactance values during switching of the screen display in the case where the radio signals are analog television signals. In this case, switch control unit 240 receives a vertical interval signal from a display unit (screen), and determines the switching period of the screen display based on the received vertical internal signal.

The whole operation of receiver 200 will now be described.

When the radio signals formed of digital or analog television signals arrive at receiver 200, antenna device 210 receives the television signals with antennas 211-213, which are switched according to antenna selection information IF(ANT211-ANT213)f1-IF(ANT211-ANT213)fm set for respective transmission modes MDE1 and MDE2 and respective frequencies f1-fm, and provides the received signals to receiving circuit 230 via coaxial cable 214.

When receiving circuit 230 receives the digital television signals, receiving circuit 20A shown in FIG. 3 demodulates the received signal according to the foregoing operations to provide a demodulated signal (received data). Also, receiving circuit 20A detects received signal quality QRS, transmission mode detection signal TMDE and frequency setting signal DF, and provides received signal quality QRS thus read, transmission mode detection signal TMDE thus read and frequency setting signal DF thus read to switch control unit 240.

In the transmission modes MDE1 and MDE2 indicated by transmission mode detection signal TMDE, memory 241 reads antenna selection information, i.e., one of information items (IF(ANT211-ANT213)f1-IF(ANT211-ANT213)fm) corresponding to the received frequency (one of frequencies f1-fm) represented by frequency setting signal DF from table TBL, and provides the antenna selection information thus read to switch control unit 240.

Switch control unit 240 compares received signal quality QRS received from receiving circuit 230 with threshold Qth determined according to reception conditions (transmission mode or transmission speed). When received signal quality QRS is equal to or greater than threshold Qth, switch control unit 240 provides holding signal HLD to switching circuit 220 according to the timing of one of the foregoing cases (T2)-(T4). When received signal quality QRS is lower than threshold Qth, switch control unit 240 selects the antenna providing received signal quality QRS equal to or greater than threshold Qth in accordance with the antenna selection information provided from memory 241, produces switching signal EXC, which performs switching to the selected antenna, according to the timing of one of the foregoing cases (T2)-(T4), and provides switching signal EXC thus produced to switching circuit 220.

Switching circuit 220 maintains the connection between antenna 211, 212 or 213 and coaxial cable 214 in accordance with holding signal HLD provided from switch control unit 240, and changes the connection between antenna 211, 212 or 213 and coaxial cable 214 to the connection between the antenna indicated by switching signal EXC and coaxial cable 214. Thereby, the antennas in antenna device 210 are switched to provide received signal quality QRS equal to or greater than threshold Qth in each transmission mode and each of frequencies f1-fm.

Receiver 200 can receive and demodulate the radio signals (digital or analog television signals) to provide received signal quality QRS equal to or greater than threshold Qth, which is determined depending on the reception conditions of the incoming radio signals. Consequently, receiver 200 can receive the radio signals with high sensitivity even when the reception conditions change.

Switch control unit 240 performs the threshold determining processing according to the timing of one of the foregoing cases (GT1)-(GT4). Thereby, the radio signals can be received with high sensitivity in each transmission mode while renewing threshold Qth at appropriate times.

Switching circuit 220 and switch control unit 240 form the "antenna switching unit".

In the description already given, antenna selection information IF(ANT211-ANT213)f1-IF(ANT211-ANT213)fm is formed of priorities, according to which the antenna suitable for setting received signal quality QRS to or above threshold Qth is selected from antennas 211-213, or is formed of the antenna designation information designating antennas 211 and 212, which provide received signal qualities QRS ranked in or above a predetermined place, from antennas 211-213. However, in the case where antenna device 210 is an array antenna, which is formed of one feeder element and one passive element, and has an electrically switchable directivity, antenna selection information IF(ANT211-ANT213)f1-IF(ANT211-ANT213)fm is formed of priorities for selecting a suitable directivity providing received signal quality QRS equal to or greater than threshold Qth from a plurality of directivities, or is formed of directivity designation information for designating the directivities providing received signal qualities QRS, which are ranked in or above a predetermined place, among the plurality of directivities.

Although the description has been given on the television set receiving the television signals, the invention is not restricted to it, and may be applied to general receivers other than the television set. Such general receivers include a car-mounted FM radio receiver, a receiver of a cellular phone (a receiving circuit of a mobile device) and others.

If the invention is applied to a general receiver, the receiver has the same structure as that shown in FIG. 13, and one of the foregoing items (a), (b), (c), (d) and (f) may be used as received signal quality QRS. In this case, the frame error in the item (c) refers to occurrence of bit errors in a data block defined by handling tens to thousands of bits as a unit. Switch control unit 240 changes the connections in switches S1 and S2 according to the switching timing of the foregoing item (T2) or (T3).

Structures and operations other than the above are the same as those of the first embodiment.

The third embodiment may be applied to the first and/or second embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A receiver for receiving radio signals having a plurality of frequencies and being transmitted by radio communication in a predetermined frequency range, comprising:
    an antenna having an electrically switchable directivity;
    a directivity pattern setting unit holding a table having a plurality of directivity patterns corresponding to said plurality of frequencies and each formed of a plurality of directivities, and setting said directivity patterns corresponding to said plurality frequencies, respectively; and
    a directivity switching unit extracting an appropriate directivity from said plurality of directivities included in said set directivity pattern such that said radio signal received by said antenna has a received signal quality equal to or greater than a threshold, and switches the directivity of said antenna to said appropriate directivity,
    wherein
    said antenna includes:
    a feeder element, and
    at least one passive element arranged around said feeder element;
    said directivity pattern setting unit sets said directivity patterns corresponding to said plurality of frequencies by changing the set of values of reactances loaded in said at least one passive element; and
    said directivity switching unit switches the directivity of said antenna to said appropriate directivity by changing the set of said reactance values, wherein
    said set of values of reactances changes the directivity of said antenna to a maximum extent.

2. The receiver according to claim 1, wherein said threshold is variable in response to a received signal strength of said radio signal.

3. The receiver according to claim 1, wherein said threshold is variable in response to a bit rate of the received signal of said radio signal.

4. The receiver according to claim 1, wherein said threshold is variable in response to a transmission mode of said radio signal.

5. The receiver according to claim 1, wherein said radio signal is a television signal, and
    said directivity switching unit switches said directivity to said appropriate directivity in synchronization with frames formed of a predetermined number of image data obtained by demodulating said television signal.

6. The receiver according to claim 1, wherein
    said radio signal is a television signal, and
    said directivity switching unit switches said directivity to said appropriate directivity during a switching period of a screen displaying a predetermined number of image data obtained by demodulating said television signal.

7. The receiver according to claim 1, wherein
    said plurality of directivity patterns are determined when said receiver is activated.

8. The receiver according to claim 1, wherein
    said radio signal is an analog television signal, and
    said received signal quality is detection/non-detection of a color burst signal for displaying a color image in said analog television signal.

9. The receiver according to claim 1, wherein
    said radio signal is a television signal, and
    said received signal quality is the fact that errors of N (N: natural number) or more in number continuously occur in frames formed of a predetermined number of image data obtained by demodulating said television signal.

10. The receiver according to claim 1, wherein
    said radio signal is a digital television signal in an orthogonal frequency division multiplex scheme, and
    said received signal quality is whether a pilot signal allocated to a specific subcarrier in said orthogonal frequency division multiplex scheme is detected in said digital television signal or not.

11. A receiver for receiving a radio signal, comprising:
    an antenna device including a plurality of antennas for receiving said radio signal or an antenna having a plurality of switchable directivities; and
    an antenna switching unit having antenna selection information for selecting from said plurality of antennas the appropriate antenna setting a received signal quality of the received signal received by said antenna device to or above a threshold or antenna selection information for selecting from said plurality of directivities the appropriate directivity setting a received signal quality of the received signal received by said antenna device to or above said threshold, and selecting said appropriate antenna or said appropriate directivity in accordance with said antenna selection information when said received signal quality is lower than said threshold, wherein said threshold is set in accordance with reception conditions of said radio signal, said antenna selection information includes priorities assigned to said plurality of antennas or said plurality of switchable directivity, and said antenna switching unit selects said appropriate antenna or said appropriate directivity in accordance with the priorities when said received signal quality is smaller than said threshold.

12. The receiver according to claim 11, wherein said antenna switching unit further selects said appropriate antenna or said appropriate directivity while changing said threshold in a predetermined range, and performs threshold determining processing to determine a value providing the highest received signal quality as said threshold.

13. The receiver according to claim 12, wherein said antenna switching unit performs said threshold determining processing when said received signal quality becomes lower than a low threshold lower than said threshold N (N: natural number) times or more.

14. A receiver for receiving a radio signal, comprising:

an antenna device including a plurality of antennas for receiving said radio signal or an antenna having a plurality of switchable directivity; and an antenna switching unit having antenna selection information for selecting from said plurality of antennas the appropriate antenna setting a received signal quality of the received signal received by said antenna device to or above a threshold or antenna selection information for selecting from said plurality of directivities the appropriate directivity setting a received signal quality of the received signal received by said antenna device to or above said threshold, and selecting said appropriate antenna or said appropriate directivity in accordance with said antenna selection information when said received signal quality is lower than said threshold, wherein said threshold is set in accordance with reception conditions of said radio signal, said antenna selection information includes an antenna designation information for designating the antennas or the directivity providing said received signal qualities ranked in a predetermined place or higher among said plurality of antennas or said plurality of directivities, and said antenna switching unit selects said appropriate antenna or said appropriate directivity in accordance with said antenna designation information when said received signal quality is lower than said threshold.

15. The receiver according to claim 14, wherein said antenna switching unit further selects said appropriate antenna or said appropriate directivity while changing said threshold in a predetermined range, and performs threshold determining processing to determine a value providing the highest received signal quality as said threshold.

16. The receiver according to claim 15, wherein said antenna switching unit performs said threshold determining processing when said received signal quality becomes lower than a low threshold lower than said threshold N (N: natural number) times or more.

* * * * *